United States Patent [19]

Bianchi et al.

[11] Patent Number: 4,700,587
[45] Date of Patent: Oct. 20, 1987

[54] DEVICE FOR CONTROLLING THE RELATIVE DISPLACEMENT OF TWO ELEMENTS, IN PARTICULAR FOR A VEHICLE SEAT STRUCTURE

[75] Inventors: François Bianchi, Valentigney; Denis Busa, Audincourt; François Fourrey, Montbeliard, all of France

[73] Assignee: Cycles Peugeot, Valentigney, France

[21] Appl. No.: 876,521

[22] Filed: Jun. 13, 1986

[30] Foreign Application Priority Data

Apr. 1, 1986 [FR] France .............................. 86 04614

[51] Int. Cl.[4] .............................................. G05G 5/06
[52] U.S. Cl. ..................................... 74/527; 297/374; 192/67 R; 192/89 A
[58] Field of Search ................ 74/586, 527; 192/67 R, 192/89 A; 297/373, 374, 375

[56] References Cited

U.S. PATENT DOCUMENTS

| | | | |
|---|---|---|---|
| 2,684,741 | 7/1954 | Gregory | 192/67 R |
| 3,099,485 | 7/1963 | Belerbach et al. | 297/373 |
| 3,315,298 | 4/1967 | Strien et al. | 74/527 X |
| 3,411,377 | 11/1968 | Golbeck | 74/527 |
| 3,786,693 | 1/1974 | Keipert | 74/527 |

FOREIGN PATENT DOCUMENTS

| | | |
|---|---|---|
| 2186904 | 12/1973 | France . |
| 1090770 | 11/1967 | United Kingdom . |
| 1168790 | 10/1969 | United Kingdom . |

Primary Examiner—Dave W. Arola
Attorney, Agent, or Firm—Sughrue, Mion, Zinn, Macpeak, and Seas

[57] ABSTRACT

This device comprises a side wall (1) fixed to one of the elements and provided with a toothed ring (12) which is, at rest, engaged with a toothed ring (14) connected to a cup which is axially movable, under the action of a plate (26) carrying balls (46), along a control rod extending axially through the toothed ring (12) of the side wall. The cup (16) is extended by a gear pinion (18) engaged with the teeth of a bar (2) for connection to the second element so that the rotation of the pinion results in the rectilinear displacement of the bar (2).

6 Claims, 5 Drawing Figures

DEVICE FOR CONTROLLING THE RELATIVE DISPLACEMENT OF TWO ELEMENTS, IN PARTICULAR FOR A VEHICLE SEAT STRUCTURE

The present invention relates to a device for controlling the relative displacement of two elements which is particularly adapted for the adjustments of seat structures and, in particular, motor vehicle seat structures.

Seat structures whose backrest may be inclined as desired and/or possibly whose seat may also be raised or inclined according to needs, are increasingly appreciated by the users. Nonetheless, in many cases, owing to questions of overall size or costs, the vehicles must be provided with fixed seat structures. Now, the system for controlling the adjustment of the positions, and more particularly for controlling the inclination of the backrest, are at the present time part of the very structure of these elements, for example of the pivotal connection which connects the backrest to the seat, so that the constructor is obliged to take into account right from the start the type of application for which the seat structure being constructed is intended and consequently to have available two different production lines. Further, the control of the adjustment, and in particular the inclination of the backrest, is necessarily close to the pivotal connection, which may some times, and in particular in the case of motor vehicles, constitute a hindrance.

An object of the present invention is to overcome these drawbacks by providing a control device which is indepedent of the pivotal connection between the seat and the backrest and permits the adjustment from any desired point.

This invention indeed provides a device for controlling the relative displacement of two elements which comprises a side wall connected to one of the elements and provided with a toothed ring through which a control rod extends, a bar connected to the other element and provided with a rectilinear set of teeth engaged with a rotary gear pinion coaxial with the control rod and connected to a cup carrying a toothed ring which is resiliently biased into engagement with the toothed ring of the side wall, and, disposed inside the cup, a driving plate connected to the control rod and spaced away from the end wall of the cup by a retractable system of balls controlling the sliding of the cup for the purpose of releasing it from the side wall and the driving of the gear pinion and the toothed bar through the plate.

Such a device may be mounted on any type of seat or other structure with no need to modify the concerned elements. Moreover, the control rod may be easily disposed at the most appropriate place.

Preferably, the bar provided with a rectilinear set of teeth includes a longitudinal groove and slides along a guide rail connected to the fixed side wall. The safety of displacement and its precision are thus enhanced.

The following description of an embodiment given by way of a non-limiting example and illustrated in the accompanying drawings will bring out the features and advantages of the invention. In these drawings.

Figure 1:
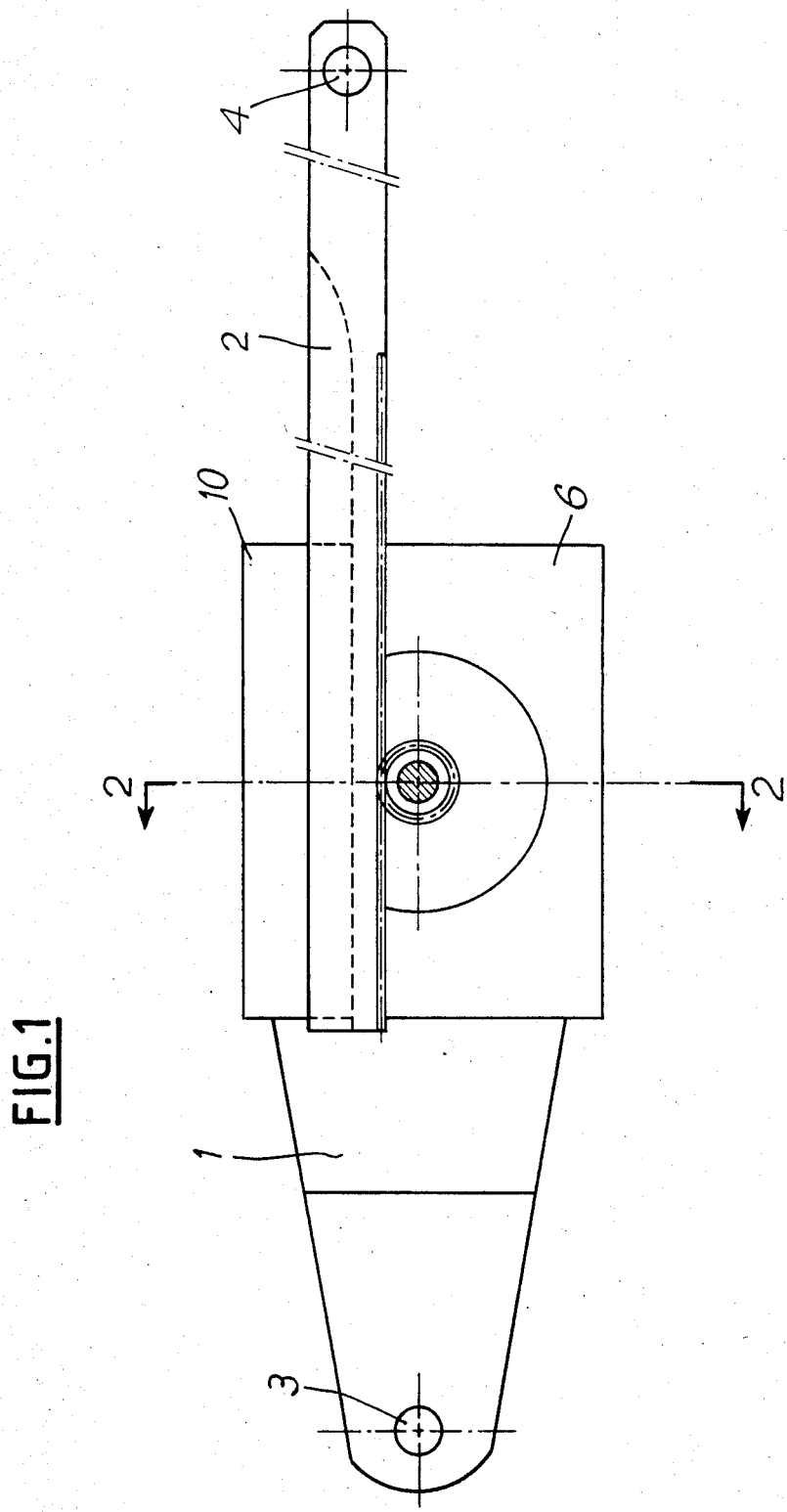
FIG. 1 is a side elevational view of a device according to the invention.

The device according to the invention is adapted to achieve the relative displacement of two elements, i.e. generally the displacement of a movable element with respect to a fixed element. For this purpose, it comprises a side wall 1 fixed at 3 to one of the elements, and a bar 2 pivotally mounted at 4 on the other element, for example constituted by the inclinable backrest of the seat structure.

The side wall 1 is fixed to a plate 6 which is bent in opposite directions at its opposite ends so that its lower portion 8 is fixed to the side wall 1 while its upper portion constitutes a guide rail 10 which engages in a longitudinal groove in the rectilinear bar 2.

Figure 3:
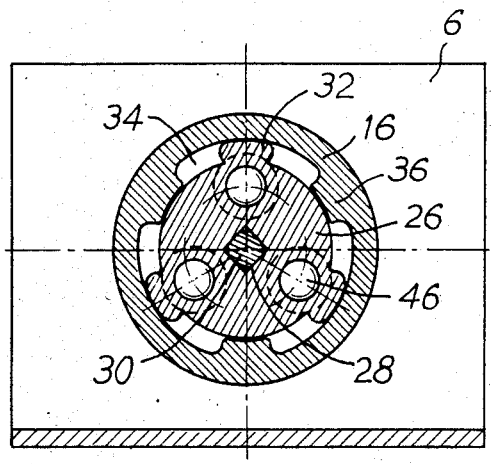
FIG. 3 is a sectional view taken on line 3—3 of FIG. 2.

In facing relation to this plate 6, the side wall 1 carries a toothed ring 12 which is, in the locking position shown in FIGS. 3 and 3, engaged with a corresponding toothed ring 14 connected to a cup 16 which is rotatable in an opening in the plate 6. The cup 16 is connected to a gear pinion 18 which is engaged with the set of teeth of the bar 2. The pinion 18 has extending axially therethrough a control rod 20 which is freely supported by the side wall 1 in the centre of the toothed ring 12. A coil spring 22 surrounding the rod 20 is mounted between a washer 24 rigid with this rod and the end of the gear pinion 14 so that it constantly biases this pinion, and consequently the cup 16, toward the toothed ring 12 of the side wall 1, i.e. toward the immobilizing or locking position shown in FIG. 2.

Mounted inside the cup 16 is a driving plate 26 which is provided in its centre with an opening 28 of square section in which is fitted a portion 30 of corresponding section of the control rod 20, so that these two elements are connected or keyed to rotate together.

The plate 26 includes on its periphery a number of lugs 32, three in the presently-described embodiment, which are each disposed in a cavity 34 in the cup 16 and define abutment surfaces. The cavity 34 has a circumferential extent which is distinctly greater than that of the lug 32 so tht the latter is movable through a certain distance or effects a lost-motion travel before coming into contact with the edge of the rib 36 which defines this cavity. Thus there is provided a coupling means between the driving plate 26 and the cup 16 which produces a lost-motion travel between the plate 26 and the cup 16 before a positive driving of the cup by the plate 26, in either direction by rotation of the plate.

The plate 26 further comprises a number of notches in which are mounted balls. These notches are provided in the opposite large sides of the plate, so that there project from notches on its side facing the side wall 2 balls 40 which merely bear against this side wall. On the side of the plate facing the end wall 44 of the cup 16, balls 46 in notches 42 engage in substantially conical recesses 48 in the end wall 44 of the cup.

Figure 2:
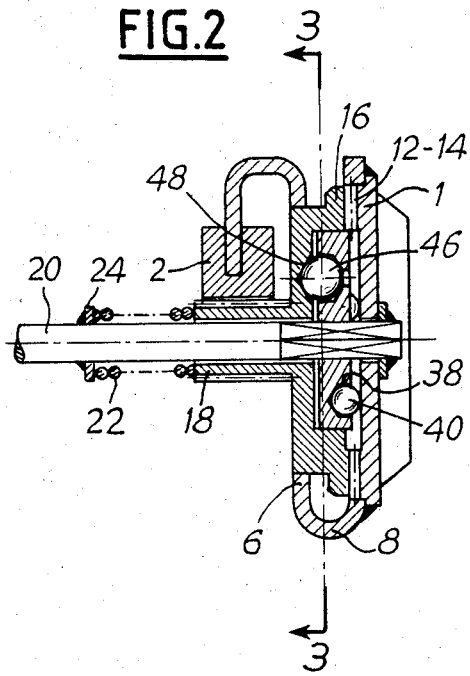
FIG. 2 is a sectional view taken on line 2—2 of FIG. 1 of the device in its position of rest.

In the position of rest shown in FIGS. 2 and 3, the balls 46 are thus solidly maintained between the plate 26 and the end wall of the cup 16 which is biased by the spring 22 against the side wall 1. Further, as shown in FIG. 3, the lugs 32 are located substantially in the middle of the cavities 34 at equal distances from the ribs 36.

Figure 4:
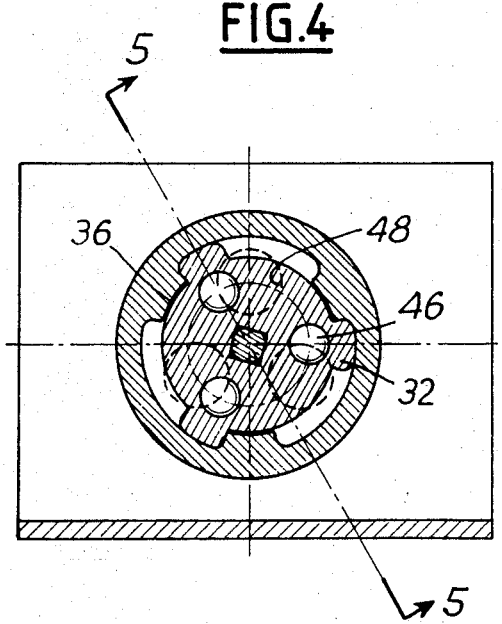
FIG. 4 is a view similar to FIG. 3 of the device in the driving position thereof.
Figure 5:
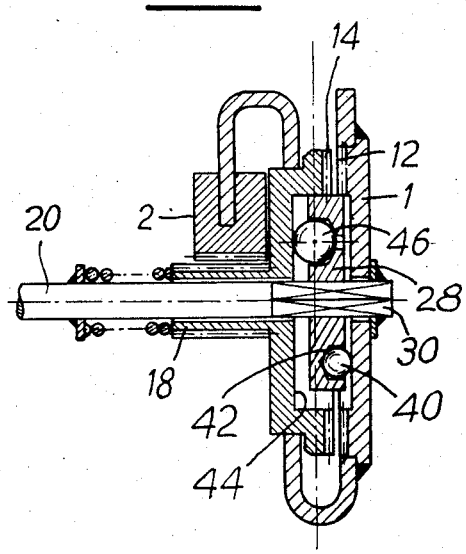
FIG. 5 is a sectional view taken on line 5—5 of FIG. 4.

When the control rod 20 is driven in rotation, for example by means of a knurled knob (not shown) and therefore rotates with respect to the side wall 1 and the toothed ring 12, the plate 26 also rotates the drives along therewith the balls 46 which roll toward the exterior of the conical recesses 48 of the end wall 44 of the cup 16. The plate 26 then progressively moves from the position shown in FIG. 3 to that shown in FIGS. 4 and 5. In the course of this movement, the balls 46, in sliding on the edges of the conical recesses 48, have urged back the cup 16, and consequently the sleeve 18, axially along the control rod 20, so that the teeth 14 are moved away from the teeth 12 (FIG. 5). Further, each of the lugs 32 has reached the end of the corresponding cavity 34 and is maintained in contact with a rib 36. If, under these coniditions, the control rod 20 continues to rotate, the plate 26 drives, through the lugs 32 and the ribs 36, the cup 16 and the gear pinion 18, which results in a longitudinal displacement of the rack 2 engaged with this gear pinion 18, and consequently a displacement of the element pivotally connected at 4 to the bar 2.

The rotation of the control rod 20 is continued until the moment when the desired displacement has been obtained. As soon as this rod is released, the balls tend to fall back automatically into the bottom of the recesses, and the spring 22 produces an angular displacement in the opposite direction which returns the lugs 32 to the centre of the cavity 34 and thus immediately puts the cup 16 back into engagement with the teeth 12 of the side wall 1, which locks the whole of the device in the chosen position of adjustment. As the lugs 32 have been put back into the centre of the cavity 34, the control rod 20 can again be driven in rotation in the desired direction, which may be in the clockwise direction or the opposite direction, depending on the displacement effected. The whole of the device is completely reversible.

It is clear that such a device can be used each time it is desired to achieve the relative displacement of two elements by means of a control disposed at an intermediate point and that it in particular permits both the adjustment of the inclination or of the position in height of the seat of a seat structure and the adjustment of the inclination of the backrest mentioned above.

However, in some cases, it may be advantageous to replace the cavities of the plate 26 by frustoconical recesses similar to those of the end wall of the cup 16, so that the balls slide simultaneously on the inclined edges of two confronting recesses. The displacement of the cup, i.e. the unlocking, is in this way accelerated. Likewise, the balls 40 may be replaced by washers, shoes or other rubbing members.

What is claimed is:

1. A device for controlling the relative displacement of two elements, said device comprising a side wall for connection to one of said two elements, a first toothed ring fixed relative to the side wall, a control rod extending coaxially through the toothed ring, a bar which is for pivotally connecting to the other of said two elements and provided with a rectilinear set of teeth, a rotary gear pinion which is coaxial with and rotatable relative to the control rod and has gear teeth engaged with said set of teeth on the bar, a cup fixed coaxially to the gear pinion and having an end wall, a second toothed ring fixed coaxially relative to the cup, means resiliently biasing the second toothed ring into engagement with the first toothed ring, a driving plate disposed coaxially inside the cup and keyed to rotate with the control rod, means for rotatively supporting the plate axially against the side wall, coupling means coupling the driving plate to the cup for rotation of the cup by the shaft in either direction, the coupling means comprising cooperative abutment means on the plate and the cup and further comprising means for producing a given lost-motion travel of the driving plate relative to the cup before positive drive of the cup by the plate through said cooperative abutment means in the two directions of rotation, bvall means rotatively mounted in one of two members consisting of the driving plate and the end wall and partly projecting from a side of said one member for rolling engagement with the other of said two members so as to maintain teeth of the second toothed ring axially out of engagement with teeth of the first toothed ring, recess means in said other of said two members in a limited part of a circular path of rotation of said ball means relative to said one of said two members upon rotation of the driving plate relative to the end wall for the purpose of causing the ball means to enter the recess means and thereby permit the second toothed ring which is fixed relative to the cup to move into axial engagement with the first toothed ring, said lost-motion travel being sufficient to allow the ball means to move out of the recess means in each direction of rotation of the driving plate before cooperation between said abutment means and a driving of the cap by the driving plate.

2. A device according to claim 1, wherein the bar comprises a longitudinal groove, and a guide rail connected to the fixed side wall is cooperative with said longitudinal groove.

3. A device according to claim 1, wherein said coupling means comprise cavities provided in the cup and defining circumferentially spaced apart abutment edges and a plurality of radial lugs provided on the driving plate and extending through said cavities in the cup and defining abutment edges cooperative with the abutment edges of said cavities for driving the cup and the gear pinion in rotation after said lost-motion travel.

4. A device according to claim 1, wherein said recess means comprise in the end wall of the cup at least one substantially conical recess, and said ball means comprise at least one ball carried by the driving plate and cooperative with said recess.

5. A device according to claim 1, wherein said means rotatively supporting the plate comprise spacing and sliding members on a side of the plate facing the side wall for spacing the plate from the side wall.

6. A device according to claim 1, wherein, in an inoperative position of the device, when the first toothed ring and the second toothed ring are in mutual engagement, said ball means are engaged in said recess means and said driving lugs are in a middle position in the respective cavities and can consequently be shifted toward either one of the abutment edges of the cavity.

* * * * *